(12) United States Patent
Ono et al.

(10) Patent No.: US 7,737,682 B2
(45) Date of Patent: Jun. 15, 2010

(54) WHEEL SPEED DETECTING APPARATUS AND A WHEEL BEARING APPARATUS INCORPORATED WITH A WHEEL SPEED DETECTING APPARATUS

(75) Inventors: Yujiro Ono, Iwata-Shi (JP); Hiroshi Kawamura, Iwata-Shi (JP); Kikuo Fukada, Iwata-Shi (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/486,883

(22) Filed: Jun. 18, 2009

(65) Prior Publication Data
US 2009/0256550 A1    Oct. 15, 2009

Related U.S. Application Data

(63) Continuation of application No. PCT/JP2007/001423, filed on Dec. 18, 2007.

(30) Foreign Application Priority Data

Dec. 20, 2006    (JP)    ............................ 2006-3242203

(51) Int. Cl.
    *G01P 3/44*    (2006.01)
(52) U.S. Cl. ...................................... 324/174; 384/448
(58) Field of Classification Search ........................ None
    See application file for complete search history.

(56) References Cited

U.S. PATENT DOCUMENTS

| 5,852,361 | A | * | 12/1998 | Ouchi et al. | ................. | 324/174 |
| 2003/0231014 | A1 | * | 12/2003 | Moretti et al. | ......... | 324/207.22 |
| 2005/0226545 | A1 | | 10/2005 | Ohtsuki et al. | | |
| 2006/0213288 | A1 | | 9/2006 | Suzuki | | |

FOREIGN PATENT DOCUMENTS

| JP | 2005-300289 | 10/2005 |
| JP | 2006-224692 | 8/2006 |
| JP | 2006-266729 | 10/2006 |

\* cited by examiner

*Primary Examiner*—Jay M Patidar
(74) *Attorney, Agent, or Firm*—Harness, Dickey & Pierce, P.L.C.

(57) ABSTRACT

A wheel speed detecting apparatus incorporated with a wheel bearing apparatus. The wheel speed detecting apparatus has an encoder, and an annular sensor holder arranged opposite to the encoder. The sensor holder has an annular fitting member formed from a steel plate. A holding portion is integrally molded with the annular fitting member. A wheel speed sensor is arranged opposite to the encoder. Several substantially circular arc notches are formed on the outer circumference of the holding portion so that portions of the periphery of the annular fitting member are exposed from the holding portion.

2 Claims, 2 Drawing Sheets

[Fig 1]
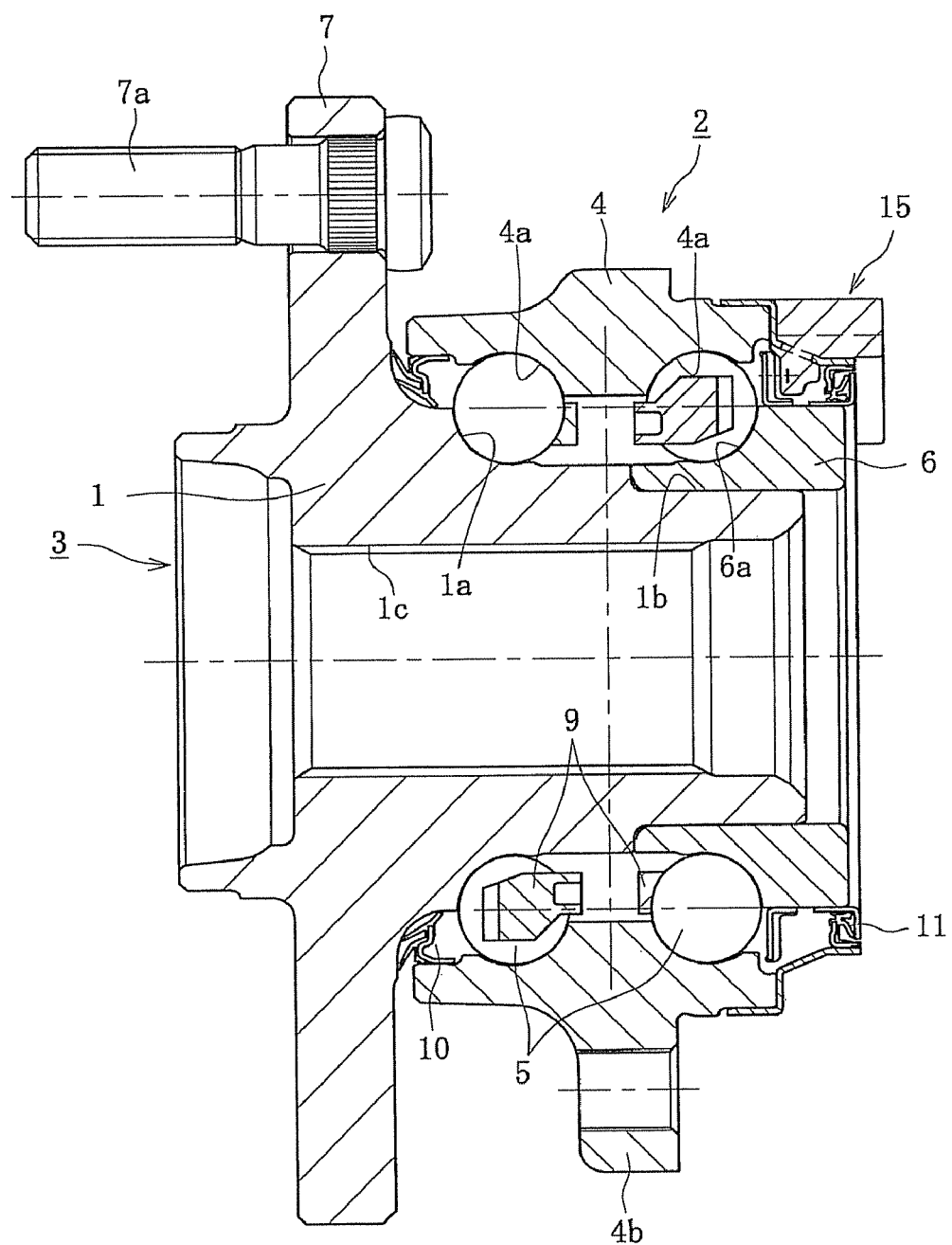

[Fig 2]
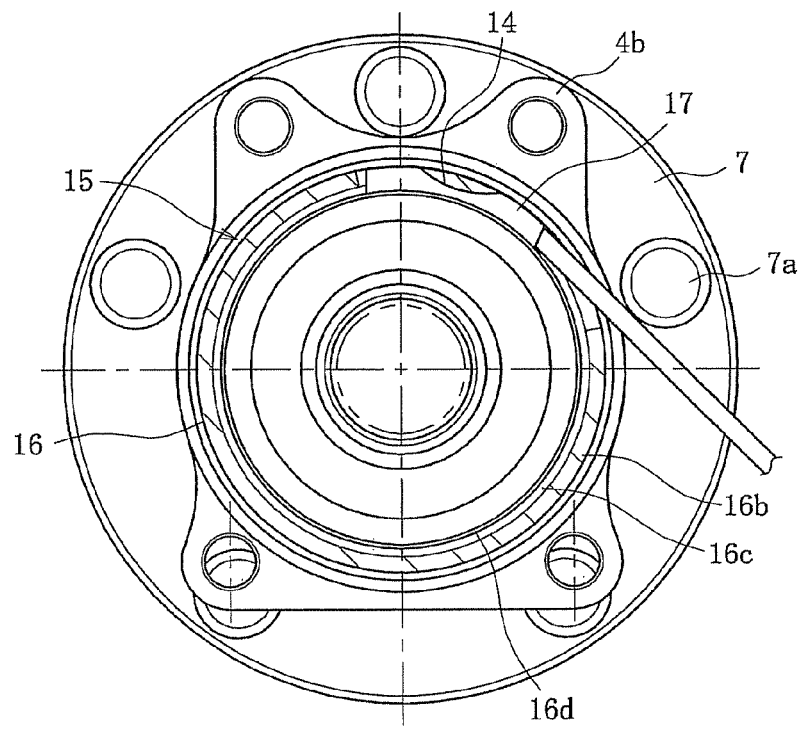
[Fig 3]
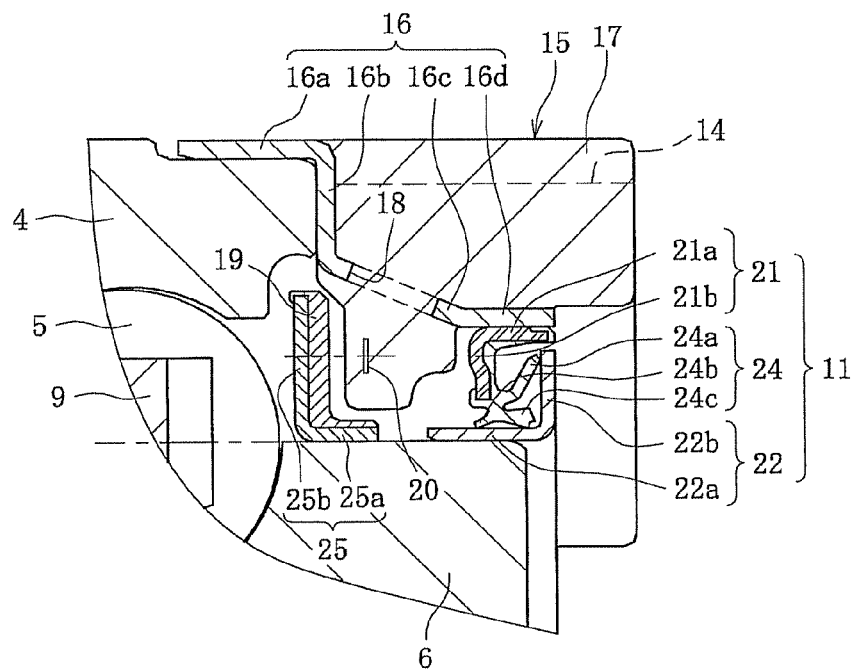

WHEEL SPEED DETECTING APPARATUS AND A WHEEL BEARING APPARATUS INCORPORATED WITH A WHEEL SPEED DETECTING APPARATUS

CROSS-REFERENCE TO RELATED APPLICATIONS

This application is a continuation of International Application No. PCT/JP2007/001423, filed Dec. 18, 2007, which claims priority to Japanese Application No. 2006-342203, filed Dec. 20, 2006. The disclosures of the above applications are incorporated herein by reference.

FIELD

The present disclosure relates to a wheel speed detecting apparatus to detect wheel speed of a vehicle wheel and also to a wheel bearing apparatus incorporated with a wheel speed detecting apparatus to rotationally support a wheel.

BACKGROUND

A wheel bearing apparatus that can support a vehicle wheel relative to a suspension apparatus and incorporates a wheel speed detecting apparatus to detect rotation speed of vehicle wheel to control the anti-lock braking system (ABS) is generally known. Such a bearing apparatus generally includes a wheel speed detecting apparatus with a magnetic encoder having magnetic poles alternately arranged along its circumference. It is integrated in a sealing apparatus arranged between the inner and outer members to contain rolling elements (balls) therebetween. A wheel speed detecting sensor detects the variation in the magnetic poles of the magnetic encoder according to the rotation of the wheel.

The wheel speed sensor is usually mounted on a knuckle after the wheel bearing apparatus is mounted on the knuckle to form a suspension apparatus. A wheel bearing apparatus incorporated with a wheel speed detecting apparatus where a wheel speed detecting sensor is incorporated in the wheel bearing in order to reduce the size of the wheel bearing apparatus as well as to eliminate troublesome air gap adjustment between the wheel speed sensor and the magnetic encoder has recently been proposed.

Japanese Laid-open Patent Publication No. 300289/2005 discloses one example of a wheel bearing apparatus incorporated with a wheel speed detecting apparatus. In this example, an encoder is fit onto an inner ring of the bearing. An annular sensor holder is mounted on one end of an outer member opposite to the encoder. A wheel speed sensor is integrally molded within the sensor holder and arranged opposite to the encoder, via a predetermined axial gap. The encoder includes an annular magnetic encoder. A seal is arranged at the inboard side of the encoder via the sensor holder. The seal has an annular first and second sealing plates mounted on the sensor holder and the inner ring arranged opposite toward each other.

In such a wheel bearing apparatus incorporated with a wheel speed detecting apparatus, a dedicated press-fitting tool is usually used to mount the sensor holder to the wheel bearing apparatus. More particularly, a metal annular fitting member forming the sensor holder is press fit onto the outer member using a press-fitting tool with a substantially "C-shape" configuration. A reason why the tool has a substantially "C-shape" configuration is to avoid pressing a weak holding portion of the synthetic resin that holds the sensor. Thus, a portion of the annular press-fitting tool is cut out to form the "C" shape.

However, sometimes a problem is caused by fact that the annular fitting member cannot be intimately contacted with an end face of the outer member. Thus, a constant air gap thickness or width between the encoder and the sensor cannot be stably obtained as well as the sealing performance becomes insufficient. This is because a sufficient pressing force cannot be directly applied onto the annular fitting member covered by the holding portion of synthetic resin when the annular fitting member is press fit by a press-fitting tool with a substantially "C" shaped configuration.

SUMMARY

It is therefore an object of the present disclosure to provide a wheel speed detecting apparatus and a wheel bearing apparatus incorporated with the wheel speed detecting apparatus that can obtain an air gap, with high accuracy, between the encoder and the sensor. This improves the reliability of the wheel speed detection without causing sealing problem.

To achieve the object, a wheel speed detecting apparatus comprises an encoder and an annular sensor holder arranged opposite to the encoder. The sensor holder includes an annular fitting member formed from a steel plate. A holding portion is integrally molded with the annular fitting member. A wheel speed sensor is arranged opposite to the encoder. Several substantially circular arc notches are formed on the outer circumference of the holding portion. Thus, portions of the periphery of the annular fitting member are exposed from the holding portion.

The wheel speed detecting apparatus includes several substantially circular arc notches that are formed on the outer circumference of the holding portion so that portions of the periphery of the annular fitting member are exposed from the holding portion. Thus, it is possible to sufficiently press fit the annular fitting member not only at portions not covered by the holding portion but also its periphery when the annular fitting member is press fit onto the outer member of the wheel bearing apparatus. Accordingly, it is possible to have a constant displacement of the annular fitting member substantially about the entire periphery. Thus, this constantly provides an air gap of high accuracy between the encoder and the sensor. This improves the reliability of wheel speed detection without causing sealing problem.

A wheel bearing apparatus incorporated with a wheel speed detecting apparatus comprises an outer member integrally formed, on its outer circumference, with a body mounting flange to be mounted on a suspension apparatus of a vehicle. The outer member's inner circumference includes double row outer raceway surfaces. An inner member includes a wheel hub and an inner ring. The wheel hub is integrally formed at one end with a wheel mounting flange. A cylindrical portion axially extends from the wheel mounting flange. The inner ring is press fit onto the cylindrical portion of the wheel hub. The wheel hub and the inner ring are formed on their outer circumferences with double row inner raceway surfaces opposite to the double row outer raceway surfaces. Double row rolling elements are contained between the outer and inner raceway surfaces of the outer and inner members. A wheel speed detecting apparatus comprises an encoder fit onto the outer circumference of the inner ring. An annular sensor holder is mounted on one end of the outer member opposite to the encoder. The sensor holder includes an annular fitting member formed from a steel plate. A holding portion is integrally molded with the annular fitting member. A wheel speed sensor is arranged opposite to the encoder. Several substantially circular arc notches are formed on the outer circumference of the holding portion so that the portions of the periphery of the annular fitting member are exposed from the holding portion.

Thus, it is possible to provide a wheel bearing apparatus incorporated with a wheel speed detecting apparatus that can have an air gap with a constant thickness or width about its periphery of high accuracy, between the encoder and the sensor. This improves the reliability of the wheel speed detection without causing sealing problem.

The wheel bearing apparatus incorporated with a wheel speed detecting apparatus includes a wheel speed detecting apparatus with an encoder fit onto the outer circumference of the inner ring. An annular sensor holder is mounted on one end of the outer member so that it opposes the encoder. The sensor holder includes an annular fitting member formed from a steel plate. A holding portion is integrally molded with the annular fitting member. A wheel speed sensor is arranged opposite to the encoder. Several substantially circular arc notches are formed on the outer circumference of the holding portion so that portions of the periphery of the annular fitting member are exposed from the holding portion. Thus, it is possible to have a constant displacement of the annular fitting member substantially entire about its periphery to constantly have an air gap of high accuracy between the encoder and the sensor. This improves the reliability of the wheel speed detection without causing sealing problem.

A wheel speed detecting apparatus comprises an encoder and an annular sensor holder arranged opposite to the encoder. The sensor holder includes an annular fitting member formed from a steel plate. A holding portion is integrally molded with the annular fitting member. A wheel speed sensor is arranged opposite to the encoder. Several substantially circular arc notches are formed on the outer circumference of the holding portion so that portions of the periphery of the annular fitting member are exposed from the holding portion.

Further areas of applicability will become apparent from the description provided herein. The description and specific examples in this summary are intended for the purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal-section view of a preferred embodiment of a wheel bearing apparatus incorporated with a wheel speed detecting apparatus.

FIG. 2 is a side elevation view of FIG. 1.

FIG. 3 is a partially enlarged view of FIG. 1.

DETAILED DESCRIPTION

A preferred embodiment of the present disclosure will be described with reference to accompanied drawings.

FIG. 1 is a longitudinal-section view of a preferred embodiment of a wheel bearing apparatus incorporated with a wheel speed detecting apparatus of the present disclosure. FIG. 2 is a side elevation view of FIG. 1. FIG. 3 is a partially enlarged view of FIG. 1. In the description below, an outer side of a bearing apparatus when it is mounted on a vehicle is referred to as the "outboard side" (the left side in a drawing). An inner side of a bearing apparatus when it is mounted on a vehicle is referred to as the "inboard side" (the right side in a drawing).

The wheel bearing apparatus incorporated with a wheel speed detecting apparatus of the present disclosure is a so-called "third generation" type where a wheel hub 1 and a double row rolling bearing 2 are united.

The double row rolling bearing 2 includes an outer member 4, an inner member 3, and double row rolling elements (balls) 5, 5. The outer member 4 is made of medium carbon steel such as S53C including carbon of 0.40~0.80% by weight. The outer member 4 is integrally formed on its outer circumference, with a body mount flange 4b. The flange 4b is adapted to be mounted on a knuckle (not shown). The outer member inner circumference includes double row outer raceway surfaces 4a, 4a. The surfaces 4a, 4a are hardened by high frequency induction quenching to have a surface hardness of about 54~64 HRC.

The wheel hub 1 is integrally formed, on its outboard side end, with a wheel mount flange 7. The wheel mounting flange 7 mounts a wheel (not shown) of a vehicle. The wheel hub 1 outer circumference includes one (outboard side) inner raceway surface 1a. A cylindrical portion 1b axially extends from the inner raceway surface 1a. The inner circumference of the wheel hub 1 is formed with serrations (or splines) 1c. An outer joint member (not shown) forming a constant velocity universal joint is inserted into the serration on the inner circumference of the wheel hub 1. In addition, hub bolts 7a are secured on the wheel mounting flange 7 at its circumferentially equidistant positions. An inner ring 6 is press fit onto the cylindrical portion 1b of the wheel hub 1. The inner ring outer circumference includes the other (inboard side) inner raceway surface 6a that corresponds to the other of the double row outer raceway surfaces 4a, 4a. It should be noted that the inner member 3 comprises the wheel hub 1 and the inner ring 6 press fit onto the wheel hub 1.

Double row rolling elements 5, 5 are contained between the outer raceway surfaces 4a, 4a of the outer member 4 and the oppositely arranged inner raceway surfaces 1a, 6a, respectively, of the wheel hub 1 and the inner ring 6. The rolling elements are rollably held by cages 9, 9. Seals 10, 11 are mounted on both ends of the outer member 4 to prevent leakage of grease contained within the bearing apparatus as well as the entry of rain water or dusts into the bearing. Although balls are used as the rolling elements in the illustrated embodiment, it will be understood that tapered rollers may be used as rolling elements.

The wheel hub 1 is made of medium carbon steel such as S53C including carbon of 0.40~0.80% by weight. The wheel hub 1 is hardened by high frequency induction hardening to have a surface hardness of 54~64 HRC. It has a hardened region from a seal land portion, that slidably contacts the outboard side seal 10, to the cylindrical portion 1b, via the inner raceway surface 1a. This not only improves the abrasive resistance of the seal land portion but also increases the mechanical strength against the rotary bending load applied to the wheel mounting flange 7.

In a preferred embodiment, an annular sensor holder 15 includes an annular fitting member 16 mounted on an end of the outer member 4. A synthetic resin holding portion 17 is integrally formed with the annular fitting member 16 as shown in FIGS. 2 and 3.

The annular fitting member 16 is formed wholly as an annular body. The fitting member 16 includes a cylindrical fitting portion 16a press fit onto the outer circumference of the outer member 4. A flange portion 16b extending radially inward from the fitting portion 16a. An inclined portion 16c is angularly inclined radially inward from the flange portion 16b. A cylindrical portion 16d extends axially from the inclined portion 16c.

The annular fitting member 16 is formed by pressing a steel plate, such as a stainless steel plate, with corrosion resistance. The holding portion 17 is integrally molded with the annular fitting member 16. Several apertures 18 are provided in the inclined portion 16c to firmly grip the synthetic resin of the holding portion 17. The seal 11 is fit into the cylindrical portion 16d of the annular fitting member 16. The sensor holder 15 is press fit onto the end of the outer member 4 so that the flange portion 16b of the annular fitting member 16 is intimately contacted by the end face of the outer member 4.

The wheel speed sensor 20 is embedded in the synthetic resin forming the holding portion 17. The sensor 20 is arranged opposite to a magnetic encoder 19, via a predetermined axial gap. The wheel speed sensor 20 includes a magnetic detecting element (such as a Hall element), a magnetic resistance element (MR element), and an IC (Integrated Circuit). The MR element changes the characteristics in accordance with the flowing direction of magnetic flux. The IC is incorporated with a waveform shaping circuit to shape the output waveform of the magnetic detecting element.

In the preferred embodiment, several substantially circular arc notches 14 are formed on the outer circumference of the holding portion 17. Thus, portions of the periphery of the annular fitting member 16 are exposed from the holding portion 17. The radial depth of each notch 14 reaches to a substantially central portion of the holding portion 17 in a radial direction. Thus, the strength of the holding portion 17 can be maintained.

FIG. 2 shows a region of contact of the press-fitting tool with the annular fitting member 16 when the annular fitting member 16 is press fit onto the outer member 4 by the press-fitting tool. It will be appreciated that it is possible to press, by the press-fitting tool, not only portions of the fitting portion 16a of the annular fitting member 16 not covered by the holding portion 17 but also portions of the flange portion 16b exposed through the notches 14 formed in the periphery of the holding portion 17 when the annular fitting member 16 is press fit onto the outer member 4 of wheel bearing apparatus. Accordingly, since the annular fitting member is directly below the head of the wheel speed sensor 20, it can be directly pushed by the press-fitting tool. Thus, it is possible to have a constant displacement of the annular fitting member 16 substantially around the entire periphery of the fitting member 16. Thus, this constantly provides an air gap of high accuracy, with a desired thickness or width, between the encoder 19 and the sensor 20. This improves the reliability of wheel speed detection without causing sealing problem.

The inboard side seal 11 includes first and second sealing plates 21, 22. Each plate 21, 22 has an "L" shaped cross-section. They are opposite toward each other. The second sealing plate 22 includes a cylindrical portion 22a positioned onto the inner ring 6. A standing portion 22b extends radially outward from the cylindrical portion 22a. The second sealing plate 22 is formed by pressing a steel plate such as an austenitic stainless steel sheet (JIS SUS 304 etc.) or a preserved cold rolled sheet (JIS SPCC etc.).

The first sealing plate 21 includes a cylindrical portion 21a fit into the sensor holder 15. A standing portion 21b extends radially inward from one end of the cylindrical portion 21a. A sealing member 24 includes a side lip 24a, a grease lip 24b and a middle lip 24c. The lips are integrally formed and bonded to the first sealing plate 21 via vulcanized adhesion. The sealing member 24 is formed from an elastic material such as rubber. The side lip 24a slidably contacts the standing portion 22b of the second sealing plate 22. The grease lip 24b and the middle lip 24c slidably contact the cylindrical portion 22a of the second sealing plate 22.

A steel base 25 is arranged opposite to the seal 11 via the holding portion 17 of the sensor holder 15. The base 25 has a substantial "L" shaped cross-section. A cylindrical portion 25a is fit onto the inner ring 6. A standing portion 25b extends radially outward from the cylindrical portion 25a. The magnetic encoder 19 is formed of an elastomer such as rubber mingled with magnetic powder, such as ferrite. The magnetic encoder 19 is integrally bonded to the inboard side of the standing portion 25b of the base 25, via vulcanized adhesion. The magnetic encoder 19 has N and S poles alternately arranged along its circumference and constructs a rotary encoder for detecting the wheel speed.

According to such a structure, the wheel speed sensor 20 is embedded in the annular sensor holder 15 and the seal 11 is arranged at the inboard side of the wheel speed sensor 20. Thus, it is possible to surely prevent entry of foreign matters, such as magnetic powders, into the space between the magnetic encoder 19 and the wheel speed sensor 20 under conditions prior to mounting of the outer joint member onto the wheel hub 1. This includes the time during transportation to an assembling line at an automobile manufacturer. Also, it prevents entry of foreign matter under severe running conditions of a vehicle. Thus, it is possible to improve the reliability of the detection of the wheel speed, to reduce the size of the radial dimension of the bearing apparatus, and also to simplify surroundings of the wheel speed sensor 20.

The illustrated embodiment is an active type wheel speed detecting apparatus with the magnetic encoder 19 and the wheel speed sensor 20, including magnetic detecting elements such as Hall effect elements. Accordingly, it is possible to use a passive type wheel speed detecting apparatus comprising e.g. a magnetic encoder, a magnet, annular coil etc. The detecting direction may be applied both to radial and axial directions.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The wheel bearing apparatus incorporated with a wheel speed detecting apparatus of the present disclosure can be applied to wheel bearing apparatus including any type of wheel speed detecting apparatus.

What is claimed is:

1. A wheel speed detecting apparatus comprising:
an encoder and an annular sensor holder arranged opposite to the encoder;
said sensor holder further comprising an annular fitting member formed from a steel plate, a holding portion integrally molded with the annular fitting member, and a wheel speed sensor arranged opposite to the encoder; and
several substantially circular arc notches formed on the outer circumference of the holding portion so that portions of the periphery of the annular fitting member are exposed from the holding portion.

2. A wheel bearing apparatus incorporated with a wheel speed detecting apparatus comprising:
an outer member integrally formed, on its outer circumference, with a body mounting flange to be mounted on a suspension apparatus of a vehicle, and said outer member inner circumference including double row outer raceway surfaces;

an inner member including a wheel hub and an inner ring, said wheel hub integrally formed with a wheel mounting flange at one end, a cylindrical portion axially extending from the wheel mounting flange, said inner ring press fit onto the cylindrical portion of the wheel hub, the wheel hub and the inner ring being formed, on their outer circumferences, with double row inner raceway surfaces opposing the double row outer raceway surfaces;

double row rolling elements contained between the outer and inner raceway surfaces of the outer and inner members;

a wheel speed detecting apparatus comprising an encoder fit onto the outer circumference of the inner ring and an annular sensor holder mounted on one end of the outer member so that it opposes to the encoder;

said sensor holder includes an annular fitting member formed from a steel plate, and a holding portion integrally molded with the annular fitting member, and a wheel speed sensor arranged opposite to the encoder; and several substantially circular arc notches being formed on the outer circumference of the holding portion so that portions of the periphery of the annular fitting member are exposed from the holding portion.

* * * * *